US008181071B2

(12) United States Patent
Cahill et al.

(10) Patent No.: US 8,181,071 B2
(45) Date of Patent: May 15, 2012

(54) AUTOMATICALLY MANAGING SYSTEM DOWNTIME IN A COMPUTER NETWORK

(75) Inventors: Jason M. Cahill, Woodinville, WA (US); Titus C. Miron, Seattle, WA (US); Lauren N. Antonoff, Seattle, WA (US); Sean L. Livingston, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 11/771,720

(22) Filed: Jun. 29, 2007

(65) Prior Publication Data

US 2009/0006884 A1    Jan. 1, 2009

(51) Int. Cl.
*G06F 11/00* (2006.01)
*G06F 11/36* (2006.01)
(52) U.S. Cl. .......... 714/48; 714/47.1; 709/225; 717/168
(58) Field of Classification Search .......... 714/47, 714/48; 709/224, 782, 227, 225; 707/638; 717/168, 170
See application file for complete search history.

(56) References Cited

U.S. PATENT DOCUMENTS

| | | | |
|---|---|---|---|
| 5,790,431 A | | 8/1998 | Ahren, Jr. et al. |
| 6,021,262 A | * | 2/2000 | Cote et al. .......... 714/48 |
| 6,052,803 A | * | 4/2000 | Bhatia et al. .......... 714/49 |
| 6,167,379 A | * | 12/2000 | Dean et al. .......... 705/9 |
| 6,565,608 B1 | * | 5/2003 | Fein et al. .......... 715/255 |
| 6,625,636 B1 | | 9/2003 | Skovira et al. |
| 6,738,811 B1 | * | 5/2004 | Liang .......... 709/224 |
| 6,907,551 B2 | * | 6/2005 | Katagiri et al. .......... 714/57 |
| 6,978,398 B2 | | 12/2005 | Harper et al. |
| 7,035,921 B1 | * | 4/2006 | Baker .......... 709/224 |
| 7,039,828 B1 | * | 5/2006 | Scott .......... 714/4 |
| 7,149,917 B2 | | 12/2006 | Huang et al. |
| 7,155,462 B1 | * | 12/2006 | Singh et al. .......... 717/170 |
| 7,250,846 B2 | * | 7/2007 | Ebling et al. .......... 340/7.28 |
| 7,549,079 B2 | * | 6/2009 | Connolly et al. .......... 714/6.1 |
| 7,676,702 B2 | * | 3/2010 | Basham et al. .......... 714/47.1 |

(Continued)

FOREIGN PATENT DOCUMENTS

CN    1620653 A    5/2005

(Continued)

OTHER PUBLICATIONS

Load Balancing Method and System of Servers in a Cluster, by Jason Forrester CN1614928 (A), 2005.*
Notice of Rejection in Japanese Patent Application 2010-514962 mailed Jan. 27, 2012.*
Machine Downtime, Machine Utilization and Downtime Systems., pp. 1-6. http://www.tascomp.com/index.php/article/articleview/143/1/6/.

(Continued)

*Primary Examiner* — Joseph Schell
(74) *Attorney, Agent, or Firm* — Merchant & Gould

(57) ABSTRACT

Embodiments are provided to automatically managing system downtime in a computer network. In one embodiment, an event is created in an application server to schedule a system downtime period for a web server. When the scheduled downtime occurs, the web server is automatically removed from the network and a downtime notification message is automatically communicated indicating that the web server is offline. In another embodiment, events may be created to schedule downtime for web-based applications, including websites. Prior to the scheduled downtime, requests to a web-based application may be automatically stopped and redirected to a specified location. In another embodiment, the operation of web servers is automatically monitored to detect the presence of a fault condition and, if a fault condition is present, then a determination may be made that the affected web servers are down and requests to the down web servers are automatically redirected to an alternate server.

10 Claims, 5 Drawing Sheets

U.S. PATENT DOCUMENTS

| | | | |
|---|---|---|---|
| 2001/0052016 A1* | 12/2001 | Skene et al. | 709/226 |
| 2002/0087680 A1* | 7/2002 | Cerami et al. | 709/224 |
| 2004/0163007 A1 | 8/2004 | Mirkhani et al. | |
| 2005/0210331 A1 | 9/2005 | Connelly | |
| 2006/0207716 A1 | 9/2006 | Schneider | |
| 2006/0217936 A1 | 9/2006 | Manson et al. | |
| 2006/0224720 A1* | 10/2006 | Bhogal et al. | 709/224 |
| 2007/0010983 A1 | 1/2007 | Bauer | |

FOREIGN PATENT DOCUMENTS

| | | |
|---|---|---|
| JP | 2002-033731 | 1/2002 |
| JP | 2006-285315 | 10/2006 |
| WO | 2005-093586 A1 | 10/2005 |
| WO | 2007-051580 A2 | 5/2007 |
| WO | WO 2009/006005 A2 | 1/2009 |

OTHER PUBLICATIONS

Reduce Downtime with Smart Scheduling. 19$^{th}$ Large Installation System administration Conference 2005, pp. 1-3. http://www.mt-online.com/articles/0604dpsi.cfm, by Leland Parker.

DPSI: Reducing Downtime Due to System Maintenance and Upgrades. 1998-2004, pp. 1-16 http://www.ncl.cs.columbia.edu/publications/lisa2005_fordist.pdf, by S. Potter and J. Nieh.

Keeping Your Business Up and Running. Rackspace Managed Hosting. Nov. 28, 2006, pp. 1-3 http://www.rackspace.com/downloads/pdfs/HighAvailability.pdf.

Chinese First Office Action dated Mar. 16, 2011 in Application No. 200880025519.2, 14 pgs.

* cited by examiner

AUTOMATICALLY MANAGING SYSTEM DOWNTIME IN A COMPUTER NETWORK

BACKGROUND

Many computer networks include a shared infrastructure of multiple computers for providing resources to end users via a single web-based interface. These computer networks typically include a distributed operating system application for controlling a server farm as a single logical unit. The server farm typically includes stateless web front ends (i.e., web servers), application servers, and a database backend which is shared by the servers. The distributed operating system enables server resources (i.e., data) to appear as one or more websites to an end user.

However, computer networks utilizing distributed operating system applications suffer from a number of drawbacks. One drawback is that when system maintenance or upgrades are required, it may be necessary to take the entire computer network offline. As a result, the websites for accessing server resources are inaccessible to users for a period of time until the maintenance or upgrade is completed. During a downtime or outage period, users of the affected websites may be temporarily redirected to another website, however currently redirection is a very manual process. In particular, the computer hosting the temporary website must be manually configured and a domain name system ("DNS") change must be manually performed for the redirection to take place. However, DNS changes often require technical expertise which may be beyond the knowledge of a system administrator and thus requires additional personnel. As a result manual redirection is often an expensive undertaking in terms of time, manpower and resources. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided to automatically managing system downtime in a computer network. In one embodiment, an event is created in an application server to schedule a system downtime period for a web server in the computer network. When the scheduled downtime occurs, the web server is automatically removed from a network load balancer which manages traffic to network servers, and a downtime notification message is automatically communicated. The downtime notification message may indicate to a system administrator that the web server is down and ready for any desired maintenance. In another embodiment, events may be created to schedule downtime for web-based applications, including websites, in the computer network. Prior to the scheduled downtime, requests to a web-based application may be automatically stopped and redirected to a specified location. In another embodiment, the operation of web servers is automatically monitored to detect the presence of a fault condition and if a fault condition is present in one or more web servers, then a determination may be made that the affected web servers are down and requests to the down web servers are automatically redirected to an alternate server.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided to automatically managing system downtime in a computer network. In one embodiment, an event is created in an application server to schedule a system downtime period for a web server in the computer network. When the scheduled downtime occurs, the web server is automatically removed from a network load balancer which manages traffic to network servers, and a downtime notification message is automatically communicated. The downtime notification message may indicate to a system administrator that the web server is down and ready for any desired maintenance. In another embodiment, events may be created to schedule downtime for web-based applications, including websites, in the computer network. Prior to the scheduled downtime, requests to a web-based application may be automatically stopped and redirected to a specified location. In another embodiment, the operation of web servers is automatically monitored to detect the presence of a fault condition and if a fault condition is present in one or more web servers, then a determination may be made that the affected web servers are down and requests to the down web servers are automatically redirected to an alternate server.

Figure 1:
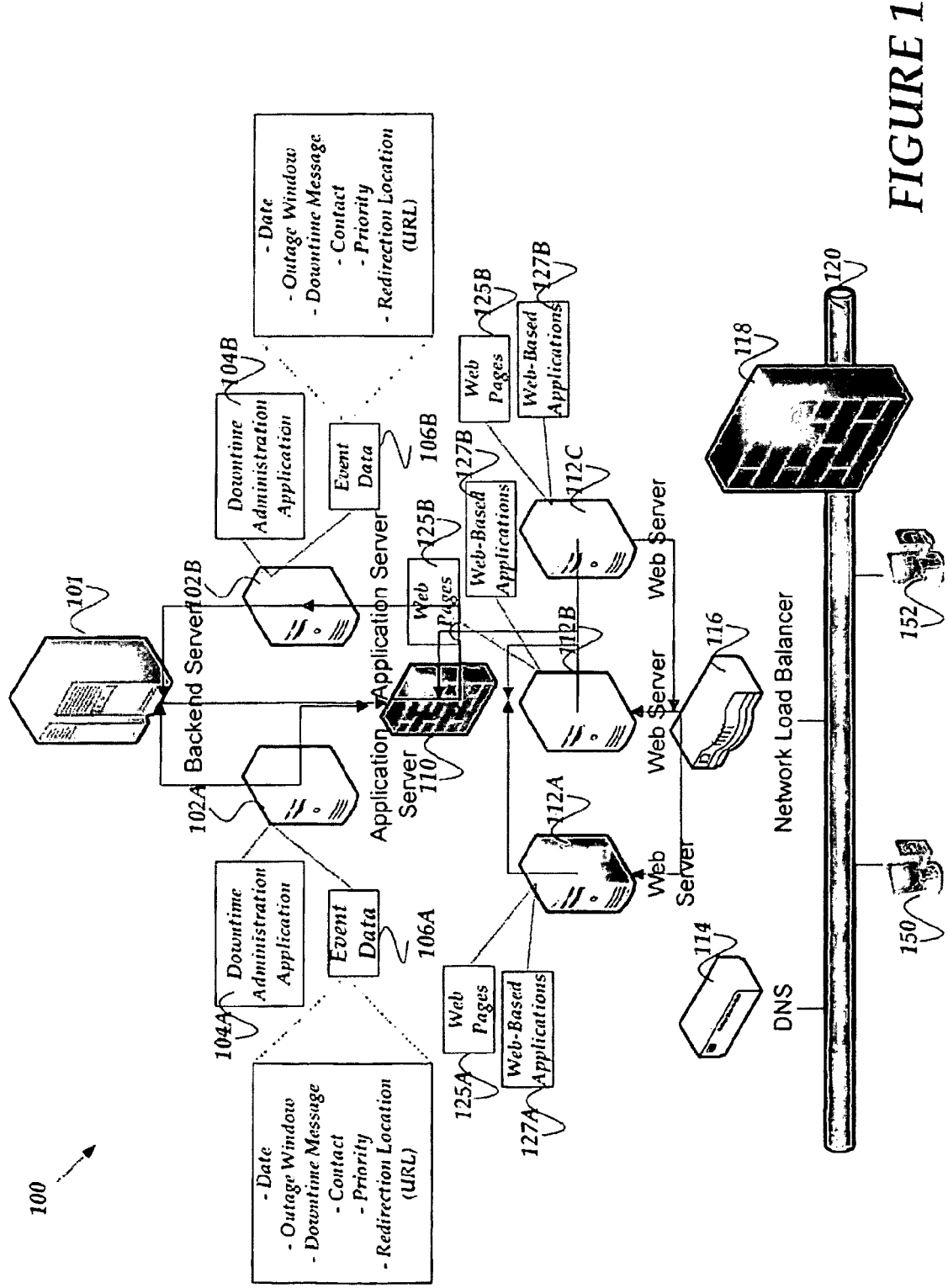
FIG. 1 is a network architecture diagram of a system configured to automatically manage system downtime in a computer network, in accordance with various embodiments.

Referring now to the drawings, in which like numerals represent like elements, various illustrative embodiments will now be described. FIG. 1 is a network architecture diagram of a computer network 100 that is configured to automatically target shared resources. In one embodiment, various components in the computer network 100 may be configured using a distributed operating system for web-based applications such as the operating system in SHAREPOINT services technology developed by MICROSOFT CORPORATION of Redmond, Wash. As is known to those skilled in the art, SHAREPOINT services technology enables users to create, maintain, and present a collaborative environment to share information. Using the technology, a user or organization can create one or more websites to provide and share information (e.g., documents on a web server or web folder, etc.) for other users associated with the websites. It should be understood that the embodiments described herein should not be construed as being limited to SHAREPOINT services technology and that other collaborative services technology from other developers and/or manufacturers may also be utilized. The computer network 100 and its components include functionality to communicate with other computing devices, communication devices, and/or other systems and are not intended to be limited to the embodiments and examples described herein.

As shown in FIG. 1, the computer network 100 includes, without limitation, a backend server 101, application servers 102A and 102B, web servers 112A, 112B, and 112C, a domain name system ("DNS") server 114, a network load balancer 116, and client computers 150 and 152. In one embodiment, the backend server 101, the application servers 102A and 102B, and the web servers 112A, 112B, and 112C may be configured to utilize SHAREPOINT services technology to create a collaborative environment for sharing information with the client computers 150 and 152. In particular, in accordance with one embodiment, the application servers 102A and 102B may be configured to run the WINDOWS SERVER operating systems incorporating WINDOWS SHAREPOINT SERVICES technology and the OFFICE SHAREPOINT SERVER application program for collaboration with client computer productivity application programs (e.g., word processing, personal information management, and spreadsheet applications) such as the OFFICE suite of application programs. All of the aforementioned operating systems, technologies, and application programs are developed by MICROSOFT CORPORATION of Redmond, Wash. It should be appreciated, however, that operating systems and application programs from other manufacturers may also be utilized to embody the various aspects of the technical features discussed herein.

The backend server 101 is in communication with the application servers 102A and 102B and the web servers 112A, 112B, and 112C (via a firewall 110). In accordance with an embodiment, the backend server 101 may comprise a structured query language ("SQL") database which stores data utilized in the network 100 and which is shared by the servers 102A, 102B, 112A, 112B, and 112C.

The application servers 102A and 102B are in communication with the backend server 101 and with the web servers 112A, 112B, and 112C (through the firewall 110). Generally, the application servers 102A and 102B may be utilized for performing search indexing operations as well as communicating information from an active directory for exposure in a website hosted by the web servers 112A, 112B, and 112C. The application servers 102A and 102B may include, without limitation, downtime administration applications 104A and 104B and event data 106A and 106B. In accordance with one embodiment, the downtime administration applications 104A and 104B may be configured to create the event data 106A and 106B (i.e., events) for scheduling downtime for the web servers 112A, 112B, and 112C as well as for web-based applications hosted on the web servers 112A, 112B, and 112C.

In one embodiment, the downtime administration applications 104A and 104B may be configured to generate a central administration website comprising a downtime management hyperlink which a network administrator may select to enter the event data 106A and 106B in a graphical user interface. The event data 106A and 106B may include, without limitation, a date for the scheduled downtime, an outage window, a downtime message, contact information, a priority associated with the scheduled downtime, and a redirection location (URL) for redirecting server requests to down (i.e., offline) web servers and/or web-based applications. For example, in accordance with various embodiments, utilizing one of the downtime administration applications 104A and 104B, a network administrator (or other user) may create an event to schedule one of the web servers 112A, 112B, or 112C to go offline for a predetermined outage period for a server software upgrade, server maintenance, the installation of a software patch, user account password updates, etc., send a downtime notification message including the reason for the scheduled downtime and contact data for obtaining additional information regarding the scheduled downtime, to one or more client computers prior to the scheduled downtime, and redirect users to an alternate server or URL during the scheduled downtime period. In accordance with an embodiment, the downtime administration applications 104A and 104B may also be configured to monitor system health with respect to the operation of the web servers 112A, 112B, and 112C. For example, the web servers 112A, 112B, and 112C may be monitored for the presence of a fault condition (e.g., a web server fails to connect to the backend database, the load on a web server CPU is too high, a maximum threshold level of requests to a web server is met, etc.) and if a fault condition is present, requests to the affected web servers are redirected to an alternate server in the network 100. The various operations which may be performed by the downtime administration applications 104A and 104B in managing system downtime in the network 100 will be discussed in greater detail below with respect to FIGS. 3-5.

The web servers 112A, 112B, and 112C are in communication with the backend server 101 and the application servers 102A and 102B via the firewall 110. The web servers 112A, 112B, and 112C are also in communication with the DNS server 114 the network load balancer 116, and the client computers 150 and 152 via the firewall 118. The web servers 112A, 112B, and 112C may include, without limitation, web pages 125A and 125B as well as web-based applications 127A and 127B. The web pages 125A and 125B may comprise hosted websites utilized by the client computers 150 and 152 to access shared resources in the network 100. For example, the web pages 125A and 125B may comprise multiple websites used by different departments in an organization such as an Information Technology ("IT") website, a human resources website, or a legal website.

The DNS server 114 is in communication with the client computers 150 and 152 over a network bus 120 via the firewall 118 and may be configured to translate domain names (e.g., www.ITweb.com) into IP addresses (e.g., 198.105.232.4). The network load balancer 116 is in communication with the client computers 150 and 152 over a network bus 120 via the firewall 118 and may be configured to load balance network traffic across a number of servers and automatically redistribute traffic to operational servers. The client computers 150 and 152 are in communication with the DNS server 114, the network load balancer 116, and the web servers 112A, 112B, and 112C, via the firewall 118 and the network bus 120. Each of the client computers 150 and 152 may comprise a general purpose desktop, laptop, handheld, tablet, or other type of computer capable of executing one or more application programs and may be utilized to send user requests to web pages, websites, and web-based applications hosted by the web servers 112A, 112B, and 112C.

Exemplary Operating Environment

Figure 2:
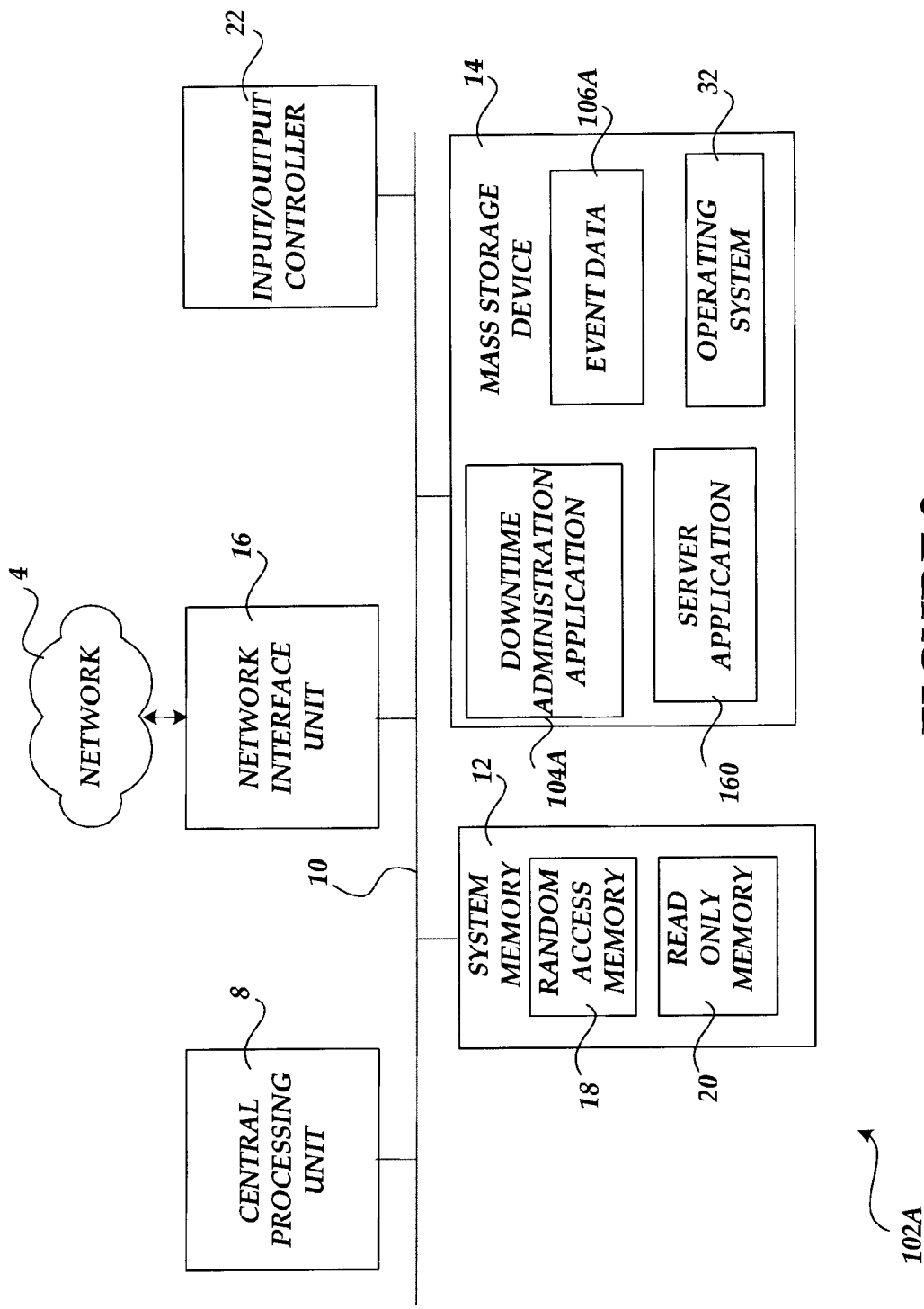
FIG. 2 is a block diagram illustrating a computing environment for implementing various embodiments described herein.

Referring now to FIG. 2, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 2, an illustrative operating environment for embodiments of the invention will be described. As shown in FIG. 2, the application server 102A comprises a server computer which may include a general purpose desktop, laptop, handheld, tablet, or other type of computer capable of executing one or more application programs. The application server 102A includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20.

The application server 102A further includes a mass storage device 14 for storing an operating system 32, the downtime administration application 104A, the event data 106A, and a server application 160. In accordance with various embodiments, the operating system 32 may comprise the WINDOWS SERVER operating systems incorporating WINDOWS SHAREPOINT SERVICES technology while the server application 160 may comprise the OFFICE SHAREPOINT SERVER application program (discussed above with respect to FIG. 1). The mass storage device 14 is connected to the CPU 8 through a mass storage controller (not shown) connected to the bus 10. The mass storage device 14 and its associated computer-readable media provide non-volatile storage for the shared resources portal 110. Although the description of computer-readable media contained herein refers to a mass storage device, such as a hard disk or CD-ROM drive, it should be appreciated by those skilled in the art that computer-readable media can be any available media that can be accessed or utilized by the application server 102A.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the application server 102A.

According to various embodiments of the invention, the application server 102A may operate in a networked environment using logical connections to remote computers through a network 4, such as a local network or a wide area network (e.g., the Internet), for example. The application server 102A may connect to the network 4 through a network interface unit 16 connected to the bus 10.

It should be appreciated that the network interface unit 16 may also be utilized to connect to other types of networks and remote computing systems. The application server 102A may also include an input/output controller 22 for receiving and processing input from a number of input types, including a keyboard, mouse, pen, stylus, finger, and/or other means. Similarly, an input/output controller 22 may provide output to a display, a printer, or other type of output device. Additionally, a touch screen can serve as an input and an output mechanism.

As mentioned briefly above, a number of program modules and data files may be stored in the mass storage device 14 and RAM 18 of the application server 102A, including an operating system 32 suitable for controlling the operation of a networked personal computer, such as the WINDOWS SERVER operating systems from MICROSOFT CORPORATION of Redmond, Wash. The mass storage device 14 and RAM 18 may also store one or more program modules. In particular, the mass storage device 14 and the RAM 18 may store the downtime administration application 104A, the event data 106A, and the server application 160.

Figure 3:
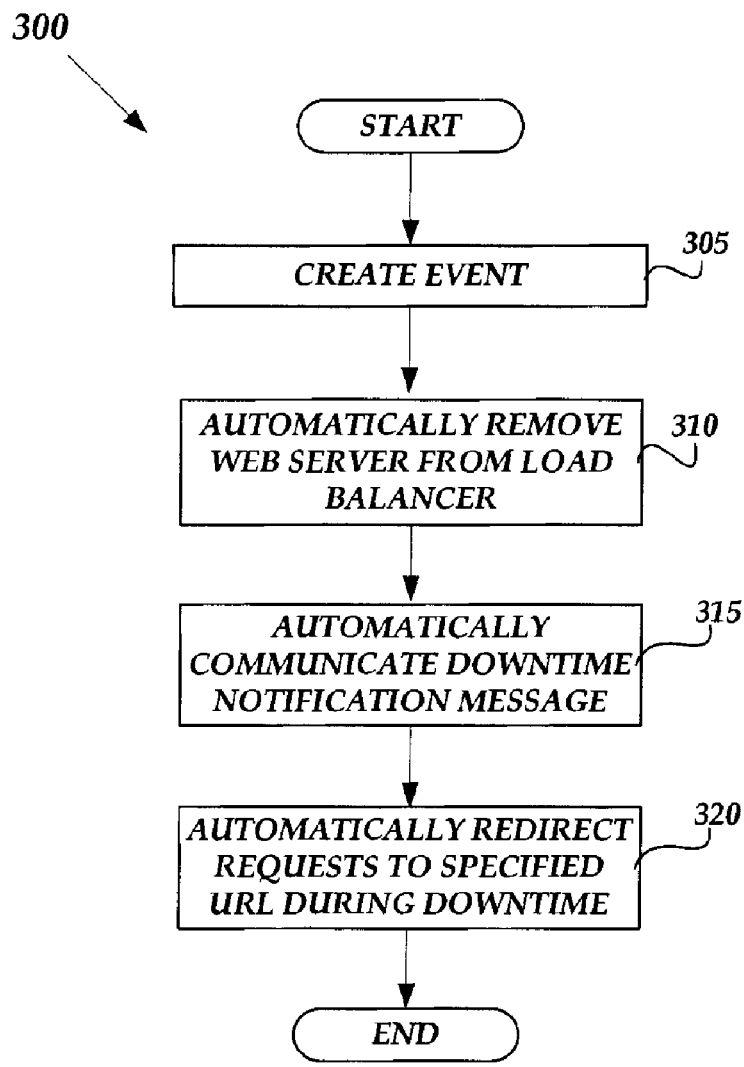
FIG. 3 is a flow diagram illustrating a routine for automatically managing system downtime in a computer network, in accordance with one embodiment.

FIG. 3 is a flow diagram illustrating a routine 300 for automatically managing system downtime in a computer network, in accordance with one embodiment. The components of FIGS. 1 and 2 are referred to in the description of FIG. 3, but the embodiment is not so limited. When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIGS. 3-5 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

The routine 300 begins at operation 305, where either of the downtime administration applications 104A or 104B executing on the application servers 102A or 102B (hereinafter referred to at the application program 102A) is utilized to create a scheduled downtime event from received event data 106A. As discussed above in the description of FIG. 1, the event data 106A may include a date for the scheduled downtime, an outage window, a downtime message, contact information, a priority associated with the scheduled downtime, and a redirection location (URL) for redirecting server requests to down (i.e., offline) web servers and/or web-based applications. For example, a downtime event may be created to take the web server 112C offline in order to perform server maintenance or for an upgrade such as the installation of a software patch.

From operation 305, the routine 300 continues to operation 310, where the downtime administration application 104A automatically removes the web server scheduled for downtime (e.g., the web server 112C) from the network load balancer 116. In particular, the downtime administration application 104A may be configured to instruct the application server 102A to automatically communicate to the network load balancer 116 to cease routing requests from the client computers 150 and 152 at the scheduled downtime.

From operation 310, the routine 300 continues to operation 315, where the downtime administration application 104A automatically communicates a downtime notification message indicating that the web server scheduled to be offline is down. In accordance with one embodiment, the downtime notification message include information as to the reason for the scheduled downtime (e.g., server maintenance), the outage window, and contact information (e.g., a telephone number or e-mail address) for obtaining additional information. The downtime notification message may be an electronic mail (e-mail) message or a personal information management calendar item which may be communicated at or prior to the scheduled downtime. In accordance with another embodiment, the downtime notification message may comprise an updated web page hosted on the affected web server prior to the schedule downtime. In this embodiment, the downtime administration application 104A may be configured to communicate with the affected web server a predetermined period prior to the scheduled downtime to update web pages to include a downtime notification message such as "This website will be unavailable from . . . "

From operation 315, the routine 300 continues to operation 320, where the downtime administration application 104A automatically redirects requests to the offline web server to a specified URL during the scheduled downtime period. In particular, the downtime administration application 104A may be configured to instruct the application server 102A to automatically communicate with the DNS server 114 to redirect web page requests from the client computers 150 and 152 to an online web server (such as the web server 112B) during the scheduled downtime. It will be appreciated that in accordance with one embodiment, the online web server may have redundant functionality (i.e., host the same web pages and/or web-based applications) with respect to the web server taken offline so that the user experience during the scheduled downtime is unaffected. It will be appreciated that at the conclusion of the scheduled downtime the offline web server may be brought back online by re-adding the web server to the network load balancer 116 and configuring the DNS server 114 to re-map requests back to the previous URLs. From operation 320, the routine 300 then ends.

Figure 4:
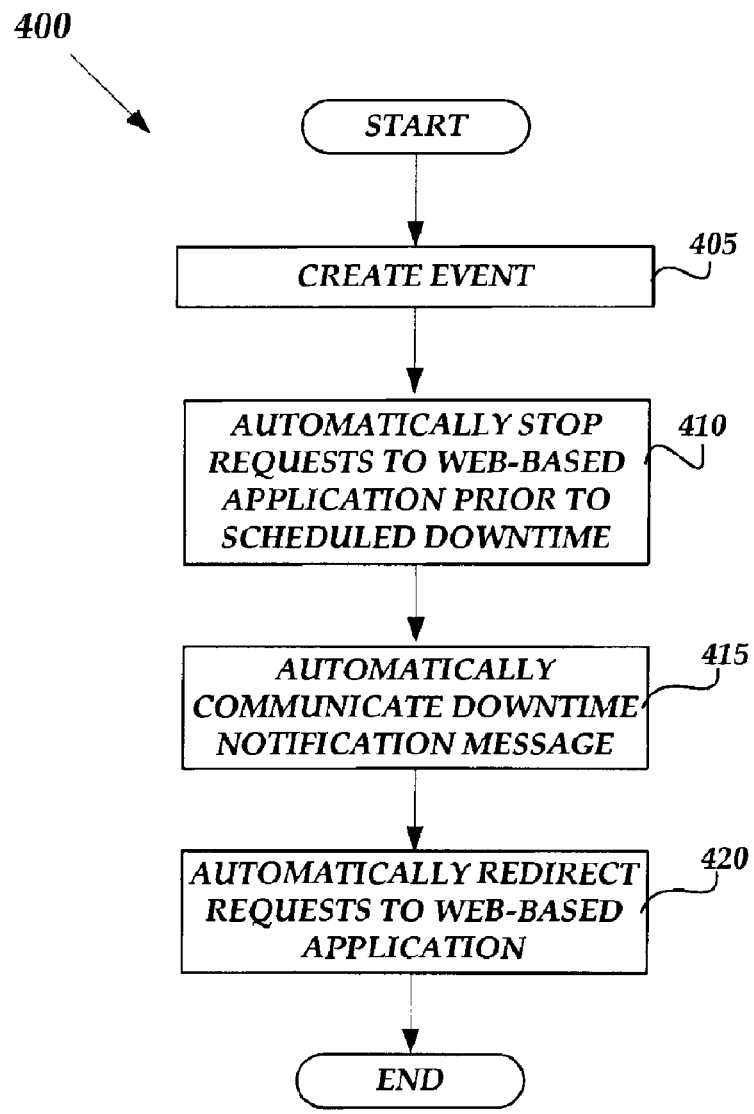
FIG. 4 is a flow diagram illustrating a routine for automatically managing system downtime in a computer network, in accordance with an alternative embodiment.

Turning now to FIG. 4, a routine 400 for automatically managing system downtime in a computer network, in accordance with an alternative embodiment, will now be described. It should be understood that the operations described in FIG. 4 may be applicable to a situation in which web-based applications or properties are taken offline while the web server itself remains functional with respect to unaffected applications or properties which are not scheduled for downtime.

The routine 400 begins at operation 405, where the application program 102A is utilized to create a scheduled downtime event from received event data 106A. As discussed above in the description of FIG. 1, the event data 106A may include a date for the scheduled downtime, an outage window, a downtime message, contact information, a priority associated with the scheduled downtime, and a redirection location (URL) for redirecting server requests to down (i.e., offline) web-based applications. For example, the web server 112C may be configured to host web-based applications for the IT department, the human resources department, and the legal department in an organization. In accordance with an embodiment, a downtime event may be created to take the application for the human resources department offline (e.g., because the application over utilizing CPU resources or to implement new customizations which may destabilize the application) so that it may be moved to another web server.

From operation 405, the routine 400 continues to operation 410, where the downtime administration application 104A automatically stops requests to the web-based application or property prior to the scheduled downtime. For example, the downtime administration application 104A may be configured to instruct the application server 102A to automatically communicate to the DNS server to stop serving incoming requests from the client computers 150 and 152 to the web-based application or property thirty minutes prior to the scheduled downtime.

From operation 410, the routine 400 continues to operation 415, where the downtime administration application 104A automatically communicates a downtime notification message indicating that the web-based application or property scheduled to be offline is down. In accordance with one embodiment, the downtime notification message may include information as to the reason for the scheduled downtime, the outage window, and contact information (e.g., a telephone number or e-mail address) for obtaining additional information. The downtime notification message may be an electronic mail (e-mail) message or a personal information management calendar item which may be communicated at or prior to the scheduled downtime. It should be understood that the period for the communication of the downtime notification message may be specified by an administrator at the time of the creation of the downtime event and that the downtime event may further be assigned a priority classification (e.g., low, normal, and high) so that for high priority events, downtime notification messages are automatically communicated a predetermined period (e.g., twenty-four hours) before a scheduled downtime.

From operation 415, the routine 400 continues to operation 420, where the downtime administration application 104A automatically redirects requests to the offline web-based application or property. In particular, the downtime administration application 104A may be configured to instruct the application server 102A to automatically communicate with the DNS server 114 to redirect incoming web-based application requests from the client computers 150 and 152 during the scheduled downtime. In accordance with one embodiment, incoming web-based application requests may be redirected to an alternate URL for a web page indicating that the web-based application is currently unavailable. In accordance with another embodiment, incoming web-based application requests may be redirected to a second version of the web-based application on the web server. In particular, the web server hosting the web-based application may be configured with both read/write and read-only versions of the web-based application. When the read/write version of the web-based application is taken offline (e.g., for an upgrade), incoming requested may be directed to the read-only version so that users may still have access to data (without being able to make changes) while an upgrade of the read/write version is taking place. It should be understood that, in accordance with one embodiment, the read/write and read-only versions of the web-based applications may be associated with the same URL, thus eliminating the need for system administrators to manage duplicate URLs. In this embodiment, the web server hosting both applications may be configured to automatically detect which version to show to requesting users (e.g., the new or read/write version is shown unless this version is undergoing an upgrade). The routine 400 then ends.

Figure 5:
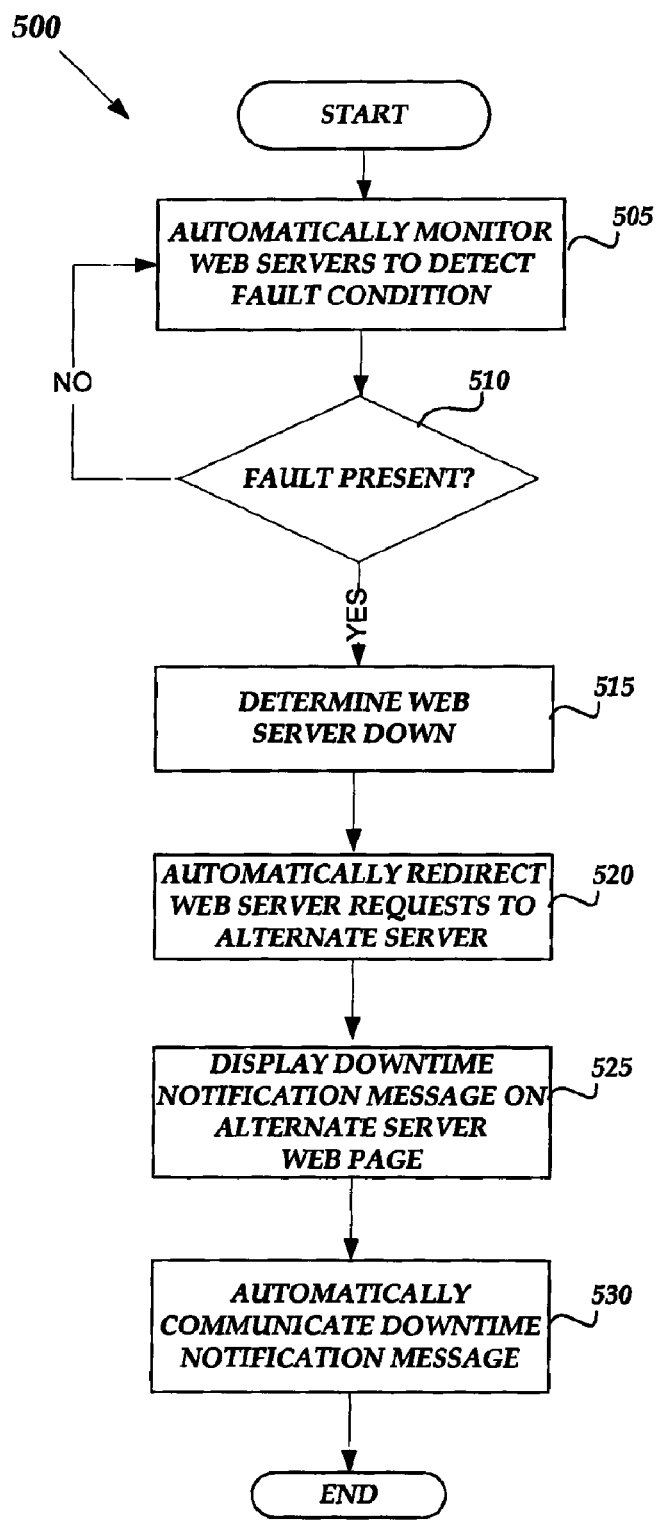
FIG. 5 is a flow diagram illustrating a routine for automatically managing system downtime in a computer network, in accordance with an alternative embodiment.

Turning now to FIG. 5, a routine 500 for automatically managing system downtime in a computer network, in accordance with an alternative embodiment, will now be described. The routine 500 begins at operation 505, where the downtime administration application program 104A is utilized to automatically monitor the operation of the web servers 112A, 112B, and 112C in the network 100 to detect a fault condition. In particular, the downtime administration application 104A may be configured with system health and diagnostic functionality which periodically monitors (e.g., hourly or daily) the web servers 112A, 112B, and 112C for system faults such as whether or not a web server is able to connect to a content database for a website.

If, at operation 510, it is determined that a fault condition is not present in any of the web servers 112A, 112B, and 112C, then the routine 500 returns to operation 505 where the downtime administration application 104A continues to monitor the web servers to detect a fault condition. If however, at operation 510, the downtime administration application 104A determines that a fault condition is present in any of the web servers 112A, 112B, and 112C, then the routine 510 continues to operation 515 where the downtime administration application 104A determines the affected web servers are down (i.e., offline).

From operation 515, the routine 500 continues to operation 520, where the downtime administration application 104A automatically redirects requests to the affected web servers to an alternate server (which may be previously designated by an administrator in the downtime administration application 104A) in the network 100. In particular, the downtime administration application 104A may be configured to instruct the application server 102A to automatically communicate with the DNS server 114 to redirect incoming requests (including web-based application and web page requests) from the client computers 150 and 152 to the alternate server.

From operation 520, the routine 500 continues to operation 525, where the downtime administration application 104A instructs the application server 102A to communicate with the alternate server to display a downtime notification message web page for all incoming requests, indicating that the server hosting the requested web page, website, or web-based application is down. From operation 525, the routine 500 continues to operation 530, where the downtime administration application 104A automatically communicates a downtime notification message to a party who may respond to the fault condition causing the currently unscheduled downtime. For example, the downtime administration application 104A may be configured to automatically send an e-mail to an operations technician upon determining that a web server is down due to a failed diagnostic. The technician, once aware of the fault, may then begin correcting the detected fault. The routine 500 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of automatically managing system downtime in a computer network comprising a plurality of servers supporting a distributed operating system for web-based applications, comprising:
creating, in an application server, an event for scheduling downtime with respect to at least one web server in the computer network;
automatically removing the at least one web server from a network load balancer associated with the plurality of servers at the scheduled downtime;
automatically communicating a downtime notification message indicating that the at least one web server is down; and
automatically updating web pages hosted by the at least one web server with a downtime notification message in advance of the scheduled downtime.

2. The method of claim 1 further comprising automatically redirecting requests made to the at least one web server scheduled for downtime to a Universal Resource Locator (URL) specified in the event for handling the requests to the at least one web server during the scheduled downtime.

3. The method of claim 1 further comprising automatically redirecting requests made to the at least one web server scheduled for downtime to at least one redundant web server in advance of the scheduled downtime.

4. The method of claim 1, wherein creating an event for scheduling downtime with respect to at least one web server in the computer network comprises receiving data comprising at least one of the following: first data comprising a date and time the downtime is scheduled to begin, second data comprising the length of an outage window associated with the downtime, third data comprising a reason for the downtime, fourth data comprising a contact for further information associated with the downtime, or fifth data comprising a location for redirecting requests to the at least one web server during the downtime.

5. A system for automatically managing system downtime in a computer network comprising a plurality of servers supporting a distributed operating system for web-based applications, comprising:
a memory for storing executable program code; and
a processor, functionally coupled to the memory, the processor being responsive to computer-executable instructions contained in the program code and operative to:
create, in an application server, an event for scheduling downtime with respect to at least one web-based application in the computer network, wherein the processor, in creating an event for scheduling downtime with respect to at least one web-based application in the computer network, is operative to receive priority data specifying a priority level for the event, wherein the priority level determines how users of the web-based application are notified of the scheduled downtime;
automatically stop requests to the at least one web-based application on a web server prior to the scheduled downtime; and
automatically redirect requests to the at least one web-based application, wherein the processor, in automatically redirecting requests made to the at least one web-based application, is operative to switch from a read/write version of the at least one web-based application to a read-only version of the at least one web-based application on the web server, wherein the processor is operative to switch to the read-only version during an upgrade of the read/write version, wherein the read/write version and the read-only version of the at least one web-based application are associated with a single URL.

6. The system of claim 5, wherein the processor is further operative to automatically communicate a downtime notification message to users of the at least one web-based application prior to the scheduled downtime.

7. The system of claim 6, wherein the downtime notification message comprises a calendar item in a personal information manager.

8. The system of claim 6, wherein the downtime notification message comprises an electronic mail (e-mail) message.

9. The system of claim 5, wherein the processor, in creating an event for scheduling downtime with respect to at least one web-based application in the computer network, is operative to perform at least one of the following: receive first data comprising a date and time the downtime is scheduled to begin, receive second data comprising the length of an outage window associated with the downtime, receive third data comprising a reason for the downtime, or receive fourth data comprising a contact for further information associated with the downtime.

10. The system of claim 5, wherein the at least one web-based application is an application for updating a user account password.

\* \* \* \* \*